Sept. 20, 1971     C. E. MOORE     3,606,181
BLOWER ATTACHMENT FOR PORTABLE FEED MILL
Filed March 24, 1969     3 Sheets-Sheet 1
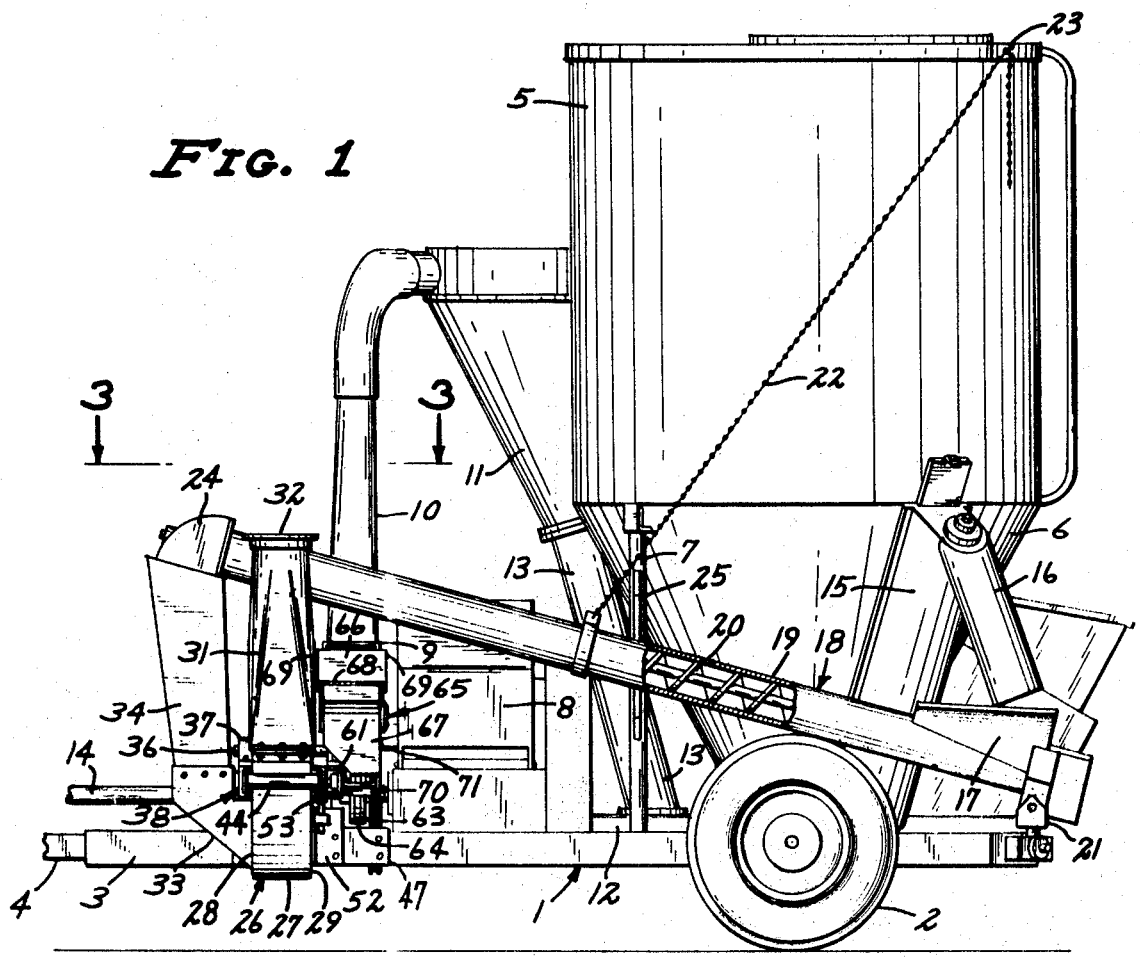
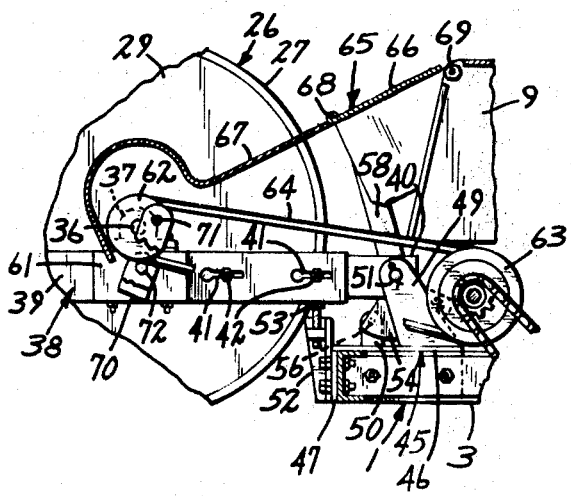
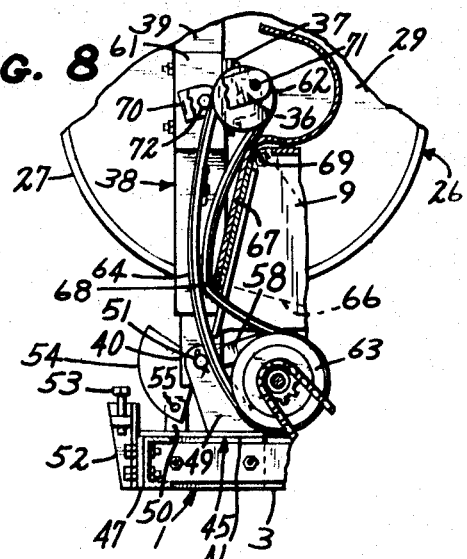
INVENTOR.
CARROLL E. MOORE
BY Merchant & Gould
ATTORNEYS Sept. 20, 1971 C. E. MOORE 3,606,181
BLOWER ATTACHMENT FOR PORTABLE FEED MILL
Filed March 24, 1969 3 Sheets-Sheet 2

INVENTOR.
CARROLL E. MOORE
BY
Merchant & Gould
ATTORNEYS

Sept. 20, 1971  C. E. MOORE  3,606,181
BLOWER ATTACHMENT FOR PORTABLE FEED MILL
Filed March 24, 1969  3 Sheets-Sheet 3
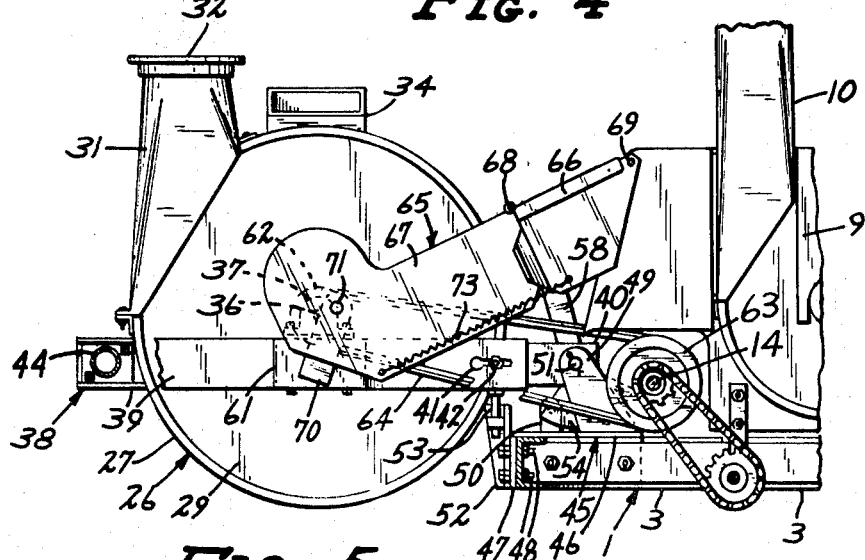
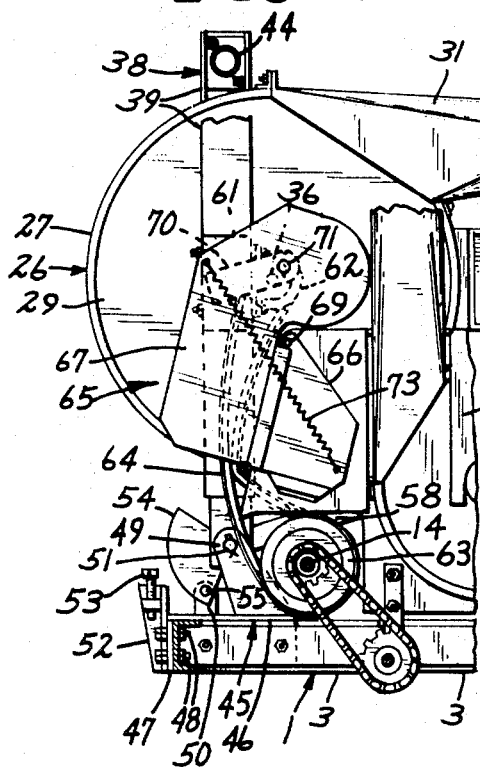
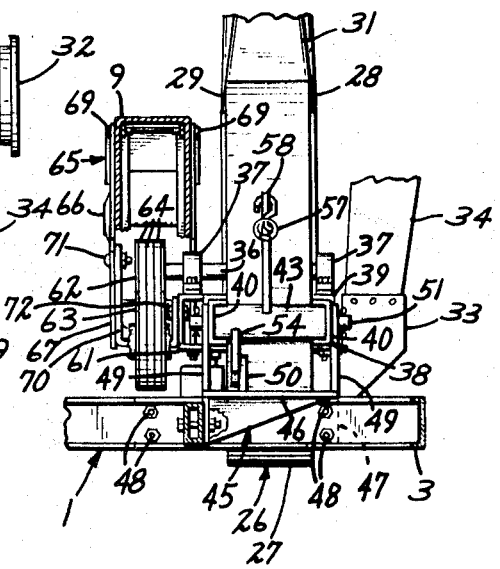
INVENTOR.
CARROLL E. MOORE
BY
*Merchant & Gould*
ATTORNEYS

United States Patent Office 3,606,181
Patented Sept. 20, 1971

3,606,181
BLOWER ATTACHMENT FOR PORTABLE FEED MILL
Carroll E. Moore, Minneapolis, Minn., assignor to Farmhand, Inc., Hopkins, Minn.
Filed Mar. 24, 1969, Ser. No. 809,693
Int. Cl. B02c 11/00; B65g 53/40
U.S. Cl. 241—60                              4 Claims

ABSTRACT OF THE DISCLOSURE

A blower carrying frame pivotally connected to a bracket for mounting on a portable feed mill of the type including a feed mixing tank, mixing mechanism connected to a drive shaft, and a discharge conveyor driven from the drive shaft. The blower has an inlet for reception of material from the conveyor, and an outlet, and is movable between inoperative storage and operative positions relative to the mixer and bracket. The blower is operatively coupled to said mixer drive shaft.

BACKGROUND OF THE INVENTION

Portable feed grinding and mixing machines or mills are well known, one example being found in U.S. Letters Patent No. 3,199,796, assigned to the assignee of this invention, the name only of the assignee company having been changed since issue of said patent. The machine of the patent, as well as the others, utilize elongated auger conveyors to discharge ground and mixed feed to points of delivery. In many instances, these points of delivery are difficult to reach by the discharge conveyor, and often separate elevators and other conveyor mechanisms must be brought to the site of operation to aid in the delivery of discharged feed.

SUMMARY OF THE INVENTION

The attachment of this invention comprises a blower having means for mounting the same on the chassis of a portable feed mill for movements between an operative feed delivery position, and an inoperative storage position in which the blower overlies the chassis and does not add materially to the overall width of the portable mill. The blower has an inlet for reception of feed material from the discharge conveyor of the mill, and an outlet for connection to suitable conduit means for guiding the feed material to the point of delivery. An endless belt transmission is operatively connected to a drive shaft on the mill and is arranged to be automatically rendered operative and inoperative to drive the blower responsive to movements of the blower to its operative and inoperative positions respectively. The mounting means for the blower includes a blower frame movable in directions to adjust tension of the belt transmission, and a transmission guard is automatically folded responsive to movement of the blower toward its inoperative storage position.

DESCRIPTION OF THE DRAWINGS

FIG. 1 is a fragmentary view in side elevation of a portable feed mill incorporating the blower attachment of this invention, some parts being broken away and some parts being shown in section;

FIG. 4 is a fragmentary view partly in transverse section and partly in rear elevation, as seen from the line 4—4 of FIG. 3;

FIG. 5 is a view corresponding to a portion of FIG. 4 but showing a different position of some of the parts;

FIG. 6 is a fragmentary section taken on the line 6—6 of FIG. 2;

FIG. 7 is a fragmentary section taken substantially on the line 7—7 of FIG. 3; and FIG. 8 is a view corresponding to FIG. 7, but showing a different position of some of the parts.

DETAILED DESCRIPTION

Figure 2:
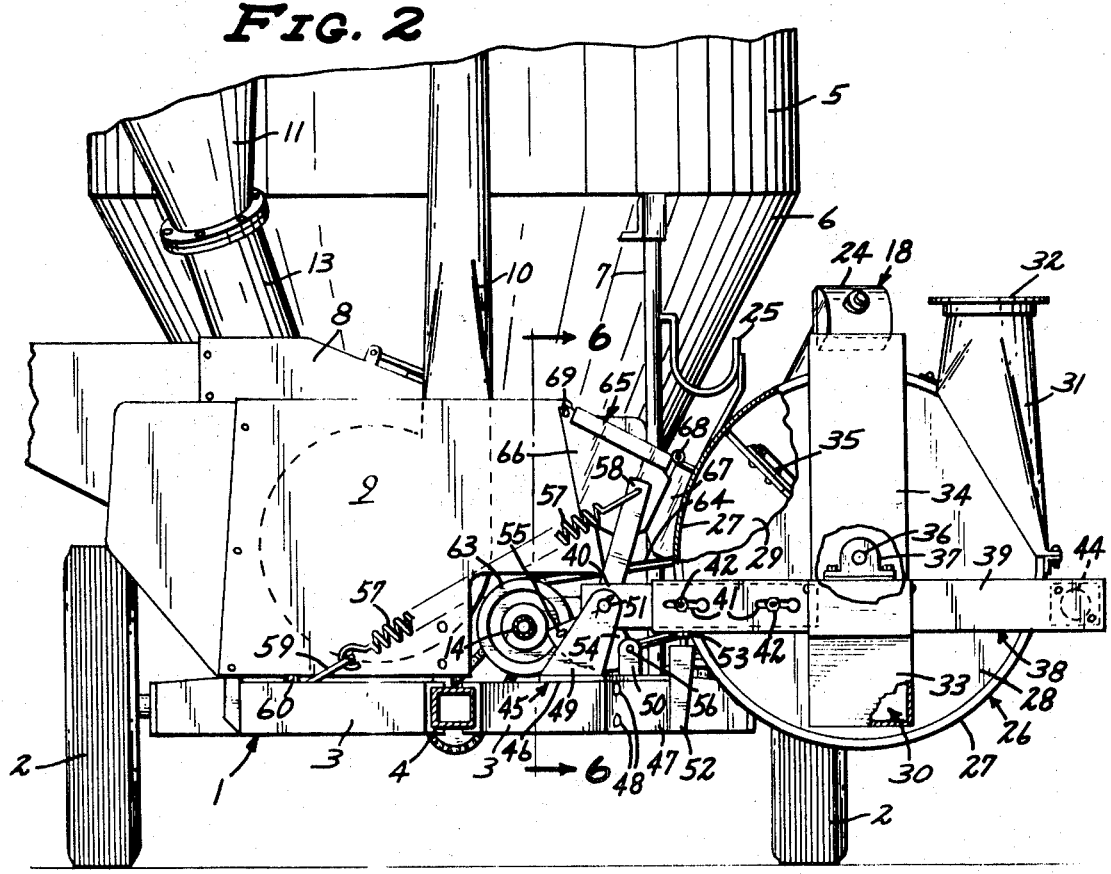
FIG. 2 is a fragmentary view in front elevation showing the blower attachment in its operative position, some parts being broken away and some parts being shown in section.
Figure 3:
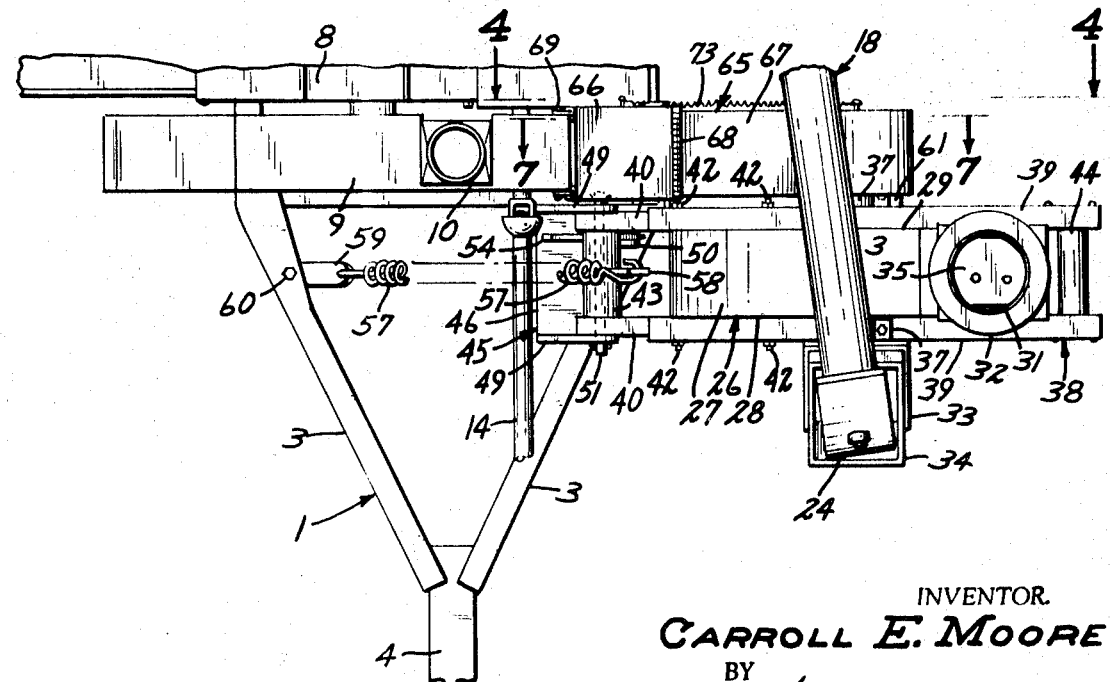
FIG. 3 is a fragmentary view in top plan as seen from the line 3—3 of FIG. 1.

In the drawings, a portable feed mill is shown as comprising a generally horizontally disposed chassis 1 mounted on a pair of laterally spaced pneumatic tire-equipped wheels 2 and having a pair of forwardly converging frame members 3 connected at their front ends to a forwardly extending hitch bar 4, fragmentarily shown. A generally cylindrical mixing tank 5, having a hopper bottom 6, is mounted on the rear end portion of the chassis 1 and supported by legs 7, one of which is shown. A conventional hammermill, not shown, but contained within a housing 8 is disposed forwardly of the mixing tank 5, and has operatively associated therewith a conventional blower contained within a casing 9 for delivery of chaff or dust through a conduit 10 to a dust separator 11. Material ground in the hammermill is delivered to the bottom of the mixing tank 5 through a conduit 12 that is connected to the separator 11 by a tubular pipe or conduit 13. Conventional mixing apparatus, not shown, is disposed within the mixing tank 5 and, with the hammermill and blower is suitably driven by a forwardly projecting drive shaft 14, which may be assumed to be operatively connected to the power take-off of a towing vehicle, not shown.

Normally, mixed material, such as feed, is discharged from the bottom of the mixing tank 5 by means of an elevator contained within a housing 15 to a chute 16 from whence the discharge material flows into a receiving hopper 17 at the lower end of an elongated discharge conveyor 18 comprising a tubular member 19 and a feeding auger 20 rotatively mounted therein. See particularly FIG. 1. The conveyor 18 is universally pivotally mounted at its receiving end, as indicated at 21, for lateral and generally upward and downward swinging movements, and is supported in various positions by a link chain 22 adjustably connected to the tank 5, as indicated at 23, in the usual manner. At its outer end, the tubular member 19 is provided with a discharge head 24, and is adapted to be supported or stored in a hook-like cradle 25 mounted on the leg 7, when not in use.

The portable feed mill, above described, is disclosed in greater detail in the above mentioned Pat. 3,199,796, and is of a well known type. Inasmuch as the feed mill, in and of itself, does not comprise the instant invention, further detailed showing and description thereof is omitted, in the interest of brevity.

The blower attachment of this invention involves a generally cylindrical blower housing 26 having a generally cylindrical wall 27, opposite end walls 28 and 29, the former of which defines an inlet opening 30, se FIG. 2, and a generally tangential outlet fitting 31 having a flanged outlet end 32 for connection to a suitable duct or conduit, not shown. An angular inlet fitting 33 is secured to the end wall 28 of the blower housing 26 around the inlet opening 30 and has secured thereto a normally upright inlet extension 34 that is adapted to receive the discharge head 24 of the discharge conveyor 18. A multibladed fan 35 is disposed in the blower housing 26, and is mounted on an axial shaft 36 that is journalled in bearings 37 that are bolted or otherwise rigidly secured to a generally rectangular mounting frame 38 that encompasses the blower housing 26. The blower frame 38 comprises a pair of longitudinally extensible and retractable legs each including leg sections 39 and 40, the former longitudinally telescopically receiving the latter and being provided with longitudinal slots 41 for reception of nut equipped locking screws or the like 42 mounted on the leg sections 40 and projecting laterally outwardly through the slots 41. The blower frame 38 further includes inner and outer tubular cross members 43 and 44 respectively, the inner cross member 43 being welded or otherwise rigidly secured to the leg sections 40, the outer cross member 44 being bolted or otherwise rigidly secured to the outer ends of the leg sections 39. The blower housing 26 is supported by the blower frame 38 by welding of the end walls 28 and 29 to their adjacent leg sections 39.

The blower mounting frame 38 cooperates with a mounting bracket 45 to mount the blower 26 for swinging movements on a substantially horizontal axis extending generally longitudinally of the chassis 1 and generally parallel to the drive shaft 14, between a blower operative position, shown in FIGS. 1–4, 6 and 7, and an inoperative storage and transport position shown in FIGS. 5 and 8. The bracket 45 comprises a generally horizontal base plate portion 46 that overlies one of the chassis frame members 3, a depending skirt portion 47 secured to the adjacent outer surface of the frame member 3 by nut-equipped bolts or the like 48, a pair of front and rear flanges 49 extending upwardly from the front and rear edge portions of the base portion 46, and a locking ear or lug 50 extending upwardly from the base portion 46 intermediate the flanges 49. The leg sections 40 have their inner ends disposed between the flanges 49, the pivotal mounting of the frame 38 to the bracket 45 comprising a pivot shaft 51 extending through aligned apertures in the flanges 49, the leg sections 40 and the inner tubular frame member 43. The bracket 45 is further formed to provide an upstanding flange 52 having a portion screw threadedly receiving a vertically adjustable stop screw or the like 53 that engages the bottom surface of one of the leg sections 38 to limit downward swinging movement of the blower 26 at its operative position. The inner tubular frame member 43 is provided with a segmental flange 54 having an opening 55 therethrough that moves into register or alignment with an opening 56 in the lug 50 for reception of a locking pin, not shown, for releasably locking the frame 38 and blower 26 carried thereby in the inoperative storage position of the blower. The blower frame 38 and parts carried thereby are yieldingly urged in the direction of pivotal movement about the axis of the shaft 51 toward the inoperative position of the blower 26 by a coil tension spring 57 having one end connected to a radial arm 58 on the blower frame member 43 and its opposite end connected to an anchoring strap 59, secured to one of the chassis frame members 3 by a nut-equipped bolt or the like 60.

As shown particularly in FIGS. 6 and 7, the rearward bearing 36 is mounted on a short channel member 61 that is welded or otherwise rigidly secured to the adjacent frame section 39, the blower or fan shaft 36 extending rearwardly of the rearward bearing 37 and having mounted thereon a multi-groove pulley 62. A similar multi-groove pulley 63 is mounted on the drive shaft 14 for common rotation therewith in alignment with the pulley 62, and a plurality of endless flexible V-belts 64 are entrained over the pulleys 62 and 63 for transmitting rotary movement from the drive shaft 14 to the fan shaft 36. The belts 64 are at least partially covered by a guard 65 comprising a pair of cooperating guard sections 66 and 67 having adjacent ends pivotally connected together by a hinge 68 disposed in generally parallel relationship to the axes of the drive shaft 14 and fan shaft 36. At its opposite end, the guard section 66 is pivotally connected to a portion of the blower housing 9, as indicated at 69, on an axis parallel to the axis of the hinge 68, the opposite end portion of the guard section 67 being pivotally secured to a bracket 70, by a pivot bolt or pin 71. The bracket 70 is of generally U-shape, as shown in FIGS. 1 and 6, and is pivotally secured to the channel member 61, as indicated at 72, the axes of the pivotal connections 71 and 72 being parallel to the axes of the hinge 68, pivotal connections 69 and drive shaft 14. As shown in FIGS. 2 and 4, when the blower 26 is swung to its operative position, the side walls of the guard sections 66 and 67 are disposed in substantially end-to-end abutting engagement. A coil tension spring 73 connected to the guard sections 66 and 67 yieldingly urges the same toward said end-to-end abutting relationship. When the blower frame 38 and blower 26 are moved to their inoperative storage positions, the guard sections 66 and 67 jack-knife about the axis of the hinge connection 68, the guard section 66 swinging generally downwardly and laterally inwardly about the pivotal connection 69, the guard section 67 swinging downwardly about the axis of the pivot pin 71 and the bracket 70 swinging about the axis of its pivotal connection 72 to their positions shown in FIGS. 5 and 8. As shown in FIGS. 4 and 5, the spring 73 moves to opposite sides of a dead center relationship with the hinge 68 during movement of the blower 26 between its operative and inoperative positions.

With reference to FIGS. 7 and 8, it will be seen that the relationship between the axes of the drive shaft 14, pivot shaft 51 and fan shaft 36 are so disposed that when the blower 26 is moved to its operative position of FIG. 7, the axis of the fan shaft 36 is disposed just below dead center relationship with the axis of the pivot shaft 51 and drive shaft 14. When the blower 26 is moved to its inoperative storage position of FIG. 8, the axis of the fan shaft 36 is moved considerably to the opposite side of said dead center relationship, and is disposed in more closely spaced relationship to the drive shaft 14 than in the operative position of the shaft 36. As shown in FIG. 8, the belts 64 bend around a portion of the guard section 67 and the folded hinge 68. However, the distance between the fan shaft 36 and drive shaft 14 is so shortened by movement of the blower 26 to its inoperative storage position, that the belts 64 only loosely engage the grooves of the drive pulley 63. Thus, the drive pulley 63 may continue to rotate when the blower 26 is moved to its storage position without exerting driving force on the belts 64.

When the blower 26 is moved to its operative position, the speed of rotation of the fan 35 is sufficient, when driven by the drive shaft 14 at its normal operating speeds, to impel material delivered to the blower by the discharge conveyor 18, to distances far in excess of the length of the discharge conveyor 18. Thus, when a suitable conduit is attached to the outlet fitting 31, material delivered to the blower 26 from the mixing tank 5 by the conveyor 18 is efficiently delivered to desired points of delivery such as remote feeding areas or storage bins having inlet openings out of reach of the discharge conveyor 18. Further, as shown in FIG. 5, when the blower 26 is moved to its inoperative storage position, it is disposed well within the outer lateral limits of the portable feed mill, so that it does not interfere with free travel of the mill, when it is moved from place to place.

What is claimed is:

1. A blower attachment for a portable feed mill, said mill including a wheel mounted chassis, a feed mixing tank on said chassis, a feed mixing mechanism including a drive shaft, and a discharge chute for said mixing tank including discharge mechanism operatively connected to said drive shaft, said blower attachment comprising:
 (a) a blower including a housing having an inlet for reception of material from said discharge chute, a normally generally upwardly directed outlet, and a rotary fan journaled in said housing;
 (b) mounting means for mounting said blower on said chassis for movements of said blower between laterally spaced operative and inoperative positions and including, (1) a bracket adapted to be rigidly mounted on said chassis;

(2) and an elongated generally rectangular blower frame pivotally mounted on said bracket on a generally horizontal axis in spaced parallel relationship to the axis of rotation of said fan, said blower being carried by said blower frame;

(3) the arrangement being such that, when said bracket is mounted on the chassis, said generally horizontal axis extends in spaced parallel relation to the axis of said drive shaft;

(c) and driving mechanism including a driving element adapted to be mounted on said drive shaft for common rotation therewith, a driven element on said fan, and an intermediate power transmission element disposed to operatively engage said driving and driven elements when said blower is in its operative position and being moved out of power transmitting engagement with at least one of said driving and driven elements responsive to movement of said blower to said inoperative position thereof.

2. The blower attachment defined in claim 1, characterized by stop means limiting movement of said blower toward said operative position thereof and disposing the axis of said blower to be intersected by a straight line substantially intersecting the axis of said drive shaft and the axis of pivotal connection between said bracket and blower frame.

3. The blower attachment defined in claim 2, in which said driving and driven elements comprise pulleys on the drive shaft and fan respectively, said intermediate power transmission element comprising an endless drive belt entrained over said pulleys, characterized by guard means for said belt comprising a pair of guard sections, one of said guard sections having means for pivotal connection to said feed mill on an axis parallel to said drive shaft, the other of said guard sections having means for pivotal connection to said blower on an axis parallel to said drive shaft, said guard sections having adjacent ends pivotally secured together on an axis parallel to said axes of pivotal connection, said guard sections being moved between inoperative folded positions and aligned operative positions responsive to movements of said blower between said inoperative and operative positions thereof.

4. The blower attachment defined in claim 1, in which said blower frame includes a pair of longitudinally extensible and contractable legs and cross bars connecting the opposite ends of said legs, one of said cross bars being pivotally mounted on said bracket, said blower being adjustably movable toward and away from said bracket responsive to extension and contraction of said legs.

References Cited
UNITED STATES PATENTS

| | | | |
|---|---|---|---|
| 826,459 | 7/1906 | Wilder | 302—37 |
| 1,237,212 | 8/1917 | Loewen | 302—37 |
| 2,041,181 | 5/1936 | Holland-Letz | 241—60 |
| 2,575,639 | 11/1951 | Scranton et al. | 241—101.5 |
| 2,588,711 | 3/1952 | Everett | 302—37X |
| 2,591,411 | 4/1952 | Delsman et al. | 302—37X |
| 2,616,765 | 11/1952 | Hill et al. | 302—37 |
| 2,691,551 | 10/1954 | Zollars | 302—37 |
| 3,199,796 | 8/1965 | Callum et al. | 241—60X |

EVON C. BLUNK, Primary Examiner

W. S. CARSON, Assistant Examiner

U.S. Cl. X.R.

214—83.26; 241—101M; 302—37